Dec. 14, 1954

H. OTZMANN, JR 2,697,204

CALIBRATABLE ELECTRICAL INSTRUMENT

Filed April 7, 1951

WITNESSES:
Robert C Baird
W. C. Groove

INVENTOR
Henry Otzmann, Jr.
BY
ATTORNEY

UNITED STATES PATENT OFFICE

2,697,204
CALIBRATABLE ELECTRICAL INSTRUMENT

Henry Otzmann, Jr., Roselle Park, N. J., assignor to Westinghouse Electric Corporation, East Pittsburgh, Pa., a corporation of Pennsylvania Application April 7, 1951, Serial No. 219,817

6 Claims. (Cl. 324—151)

This invention relates to electromagnetic instruments, and it has particular relation to permanent-magnet movable-coil electrical measuring instruments.

The invention is suitable for electrical instruments having a magnetic structure which defines an airgap and having translating means responsive to a magnetic field established in the airgap. The invention is particularly suitable for permanent-magnet movable-coil instruments and will be described with reference to such an instrument.

The accuracy of a permanent-magnet movable-coil instrument may depend to a substantial extent on the history of the instrument during or following manufacture. During manufacture of the instrument, the manufacturer finds it virtually impossible to follow an exact design specification. For this reason, permissible variations or tolerances are specified for such factors as magnet strength, spring torque, moving element resistance, swamping resistance and series resistance. Because of the tolerances, instruments which are produced by a manufacturer may vary substantially in performance. For this reason, it is desirable that adjustments or calibrators be provided to permit calibration of each instrument following its manufacture.

The calibration of an instrument also may be dependent on the specific application of the instrument following its manufacture. For example, a steel panel on which a permanent magnet movable coil instrument is mounted may weaken appreciably the magnetic field within which the instrument moving coil operates. A calibrator provided for such an instrument preferably should be of a capacity sufficient to permit mounting of the instrument on magnetic or non-magnetic panels as desired.

In order to compensate for variations in the zero position of a permanent-magnet movable-coil instrument, it is conventional practice to provide each instrument with a zero adjuster. Furthermore, it has been proposed that a magnetic shunt be employed for permitting adjustment of the strength of the magnetic field employed in the permanent-magnet moving-coil instrument. An example of such a shunt will be found in the Stickney et al. Patent 2,179,305.

In accordance with the invention, an auxiliary permanent magnet is employed as a calibrator for the purpose of controlling the strength of a magnetic field employed in an instrument. As applied to a permanent-magnet moving-coil instrument, this calibrator is mounted to produce an auxiliary magnetomotive force across the airgap of the instrument. The magnitude and polarity of the auxiliary magnetomotive force are adjusted by rotation of the calibrator.

It is, therefore, an object of the invention to provide an electromagnetic instrument having a magnetic field with a permanent magnet calibrator for adjusting the strength of the magnetic field.

It is a further object of the invention to provide a permanent-magnet moving-coil instrument with an auxiliary permanent magnet which is adjustable for the purpose of adjusting the strength of the magnetic field within which the moving coil is positioned.

Other objects of the invention will be apparent from the following description taken in conjunction with the accompanying drawing, in which.

Figure 1:
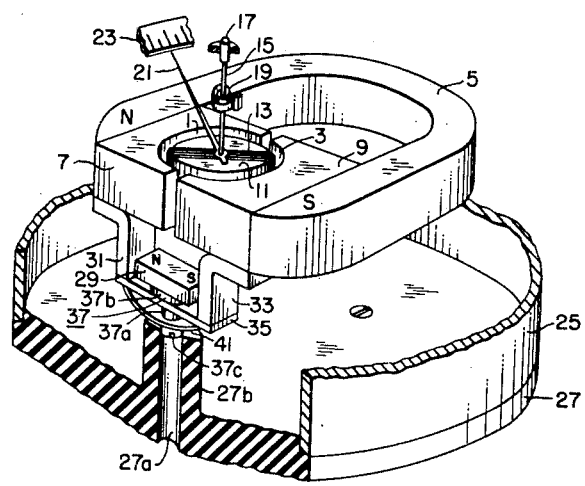
Figure 1 is a view in perspective with parts broken away of a permanent-magnet moving-coil instrument embodying the invention.

Referring to the drawing, Fig. 1 shows an electromagnetic instrument having an airgap within which a magnetic field is produced. This instrument takes the form of a permanent-magnet moving-coil instrument having a stator including a magnetic structure which defines two airgaps 1 and 3. Any portion of the magnetic structure may be constructed of permanent-magnet material capable of directing magnetic flux through the airgaps 1 and 3. In the specific embodiment of Fig. 1, the magnetic structure includes a U-shaped permanent magnet 5 having pole pieces 7 and 9 secured in any suitable manner to the permanent magnet polar ends. Suitable polarities for the permanent magnet are indicated in Fig. 1 by the polarity markings, N, for north pole, and S, for south pole. The magnetic structure also includes a cylindrical core 11 which is spaced from arcuate pole faces of the pole pieces 7 and 9 to define the arcuate airgaps 1 and 3. Although the pole pieces and the core may be constructed of permanent-magnet material, they will be assumed to be constructed of a soft magnetic material such as soft iron or steel.

A coil 13 surrounds the core 11 and is mounted for rotation with respect to the magnetic structure. Thus the upper end of the coil may have a stub shaft 15 secured thereto. The free end of this shaft is provided with a pivot for reception in a suitable bearing screw 17. A spiral spring 19 has its inner end secured to the stub shaft 15 and its outer end secured in any suitable manner to the stator, of which the magnetic structure forms a part. The spring 19 may be employed for the purpose of biasing the coil 13 towards a predetermined position with respect to the stator and it also may be employed for establishing an electrical connection between one end of the core 13 and an external circuit. A similar stub shaft, spring and bearing screw assembly may be provided for the lower end of the coil 13.

The shaft 15 also has secured thereto a pointer 21 which cooperates with a scale 23 to indicate the value of the quantity which is measured by the measuring instrument. The instrument may be enclosed within a suitable casing having a tubular shell 25 and a base 27. It will be understood that the casing has a window (not shown) through which the pointer 21 and the scale 23 may be viewed. In order to adjust the zero position of the pointer 21, the outer end of the spring 19 may be adjustable with respect to the associated stator. Such adjustment is well known in the art. The portions of Fig. 1 which thus far have been specifically described are well known in the art. Since the construction and operation of permanent-magnet movable-coil instruments of this general type are well known in the art, a more detailed discussion thereof is believed to be unnecessary.

In order to adjust the strength of the magnetic field in the airgaps 1 and 3, an auxiliary permanent magnet or calibrator 29 is incorporated in the instrument. This calibrator establishes an auxiliary magnetomotive force across the airgaps and the magnitude and polarity of the auxiliary electromotive force is adjustable in response to adjustment of the calibrator 29.

Conveniently, the calibrator 29 may be located between two polar extensions 31 and 33 which are secured in any suitable manner as by welding or by machine screws (not shown) respectively to the pole pieces 7 and 9. The polar extensions 31 and 33 may be constructed of soft magnetic material such as soft iron or soft steel. A non-magnetic bridge 35, which may be constructed, for example, of brass, is secured in any suitable manner as by soldering or by machine screws (not shown) to the ends of the polar extensions 31 and 33.

Figure 3:
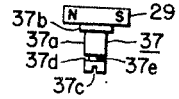
Fig. 3 is a view in elevation of an auxiliary permanent-magnet assembly employed as a calibrator in the instrument of Fig. 1.

The calibrator 29 is mounted for rotation on the bridge 35 in any suitable manner. For example, the calibrator 29 may be secured to a support 37 (Fig. 3). This support has a cylindrical body 37a which has an enlarged head 37b at one end and a screwdriver slot 37c at its remaining end. A peripheral groove 37d is formed in the body to define a neck 37e which has a diameter smaller than the diameter of the body. The support may be constructed of a nonmagnetic material, such as brass, and may be secured to the calibrator 29 in any suitable manner, such as by soldering.

Figure 2:
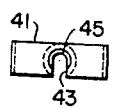
Fig. 2 is a view in bottom plan of a spring retainer employed in the instrument of Fig. 1.

The bridge 35 (Fig. 1) has an opening proportioned to receive snugly the body 37a of the support. The head 37b of the support acts as a spacer between the calibrator 29 and the bridge 35. The calibrator is retained in position by means of a bow spring 41 which has a centrally disposed slot 43 formed therein (Fig. 2). The slot 43 is proportioned to receive snugly the neck 37e (Fig. 3). In addition, the spring has on its convex side a circular depression 45 having a diameter slightly greater than the diameter of the body 37a (Fig. 3). When the spring 41 is in mounted position as illustrated in Fig. 1, the center of the spring is biased downwardly to urge the head 37b into firm engagement with the bridge 35. Because of the constant pressure exerted by the spring on the calibrator, the calibrator is held securely in mounted position and yet may be rotated as desired. It will be noted further that the calibrator may be readily replaced. For example, the calibrator of Fig. 1 may be replaced by a calibrator similar in construction but having a different coercive force.

Preferably, the calibrator and the associated casing are so constructed that the calibrator may be adjusted without disturbing the casing in any way. For example, the base 27 of the casing may have an opening 27a formed therein through which a screwdriver may be inserted for the purpose of adjusting the calibrator. To prevent entry of dust into the casing, the base 27a may be provided with a tubular extension 27b which snugly embraces the end of the body 37a which contains the screwdriver slot 37c.

It is believed that the operation of the calibrator now may be set forth. Polarities for the calibrator are represented in Fig. 1 by the conventional polarity mark N for north pole and S for south pole. With the polarities as illustrated in Fig. 1, the calibrator 29 assists the permanent magnet 5 in directing magnetic flux through the airgaps 1 and 3. Consequently, the magnetic flux density in the airgaps is greater than that which would be provided by the permanent magnet 5 alone.

Let it be assumed next that the calibrator 29 is rotated 90° from the position illustrated in Fig. 1. When so located, the calibrator 29 has negligible effect on the magnetic fields present in the airgaps 1 and 3. Consequently, the magnetic flux density in the airgaps is equal substantially to that which would be provided by the permanent magnet 5 alone.

Should the calibrator 29 be rotated 180° from the position illustrated in Fig. 1, the poles of the calibrator would be adjacent respectively, unlike poles of the magnet 5. Under these circumstances, the magnetic flux density in the airgaps 1 and 3 would be substantially less than the densities obtained by provision of the permanent magnet 5 alone. Intermediate positions of the calibrator would produce intermediate effects on the magnetic flux density on the airgaps 1 and 3. It should be noted that the adjustment for the calibrator 29 is a continuous adjustment. The calibrator can be rotated continuously and does not require stops of any type. Furthermore, it should be noted that the calibrator 29 permits the full strength of the permanent magnet 5 to be utilized. For example, the tolerance prescribed for manufacture of the instrument may be such that with the calibrator displaced 90° from the position illustated in Fig. 1, the average instrument measures correctly. This means that the entire strength of the permanent magnet 5 is utilized in the average instrument. Inaccuracies in instruments which deviate from the average may be compensated by suitable adjustment of the calibrator 9. To illustrate the range of adjustment which may be obtained by such a calibrator, a variation of the order of 45% of the full-load reading of the instrument may be obtained readily by adjustment of the calibrator 29. Since the adjustment provided by the calibrator 29 is self-contained, the instrument may be readily adjusted in the field for use on magnetic or non-magnetic panels, as desired.

Although the invention has been described with reference to certain specific embodiments thereof, numerous modifications falling within the spirit and the scope of the invention are possible.

I claim as my invention:

1. In a permanent-magnet, moving-coil instrument, a magnetic structure having an airgap arcuate about an axis, said magnetic structure including a first permanent magnet for producing a magnetic field in the airgap, a coil having a coil side disposed in said airgap, means mounting the coil for rotation relative to the magnetic structure about said axis, said coil side being positioned to develop a motor action by the reaction of current flowing therethrough and said magnetic field which urges the coil about said axis relative to the magnetic structure, a second permanent magnet cooperating with the magnetic structure to shunt said airgap, and means mounting the second permanent magnet for adjustment about an axis to vary the magnetomotive force applied thereby across said airgap said motor action operating to move the coil relative to the second permanent magnet.

2. An instrument as claimed in claim 1 in combination with a casing having a base member substantially transverse to said axes, said second permanent magnet being accessible for adjustment through said base member.

3. An instrument as defined in claim 1 wherein the magnetic structure includes a pair of spaced pole pieces magnetically connected respectively to the poles of said first permanent magnet, the poles of said second permanent magnet being positioned for movement respectively towards and away from said pole pieces in response to adjustment of the second permanent magnet about the second axis.

4. An instrument as claimed in claim 3, wherein said mounting means includes a non-magnetic bridge member connecting said pole pieces, and means mounting the second permanent magnet on said bridge member for rotation relative to the bridge member about said axis.

5. In a moving coil instrument, a magnetic structure defining an airgap, said magnetic structure including means for establishing a first magnetomotive force across said airgap, a permanent magnet for establishing a second magnetomotive force across the airgap, a coil having a coil side in the airgap, means mounting the coil for movement relative to the magnetic structure and the permanent magnet in response to the reaction between current passing through the coil and a magnetic field in the airgap, and means mounting the permanent magnet for adjustment relative to the magnetic structure through a range sufficient to bring said magnetomotive forces into opposing or aiding relationships.

6. In a moving coil instrument, a magnetic structure defining an airgap, said magnetic structure including a first permanent magnet for establishing a first magnetomotive force across said airgap, a second permanent magnet for establishing a second magnetomotive force across the airgap, a coil having a coil side in the airgap, means mounting the coil for movement relative to the magnetic structure and the permanent magnets in response to the reaction between current passing through the coil and a magnetic field in the airgap, and means mounting the second permanent magnet for rotational adjustment relative to the magnetic structure about an axis and through a range sufficient to bring said magnetomotive forces into opposing or aiding relationships.

References Cited in the file of this patent

UNITED STATES PATENTS

| Number | Name | Date |
|---|---|---|
| 497,448 | Hoyt | May 16, 1893 |
| 691,393 | La Roche | Jan. 21, 1902 |
| 1,282,497 | Trent | Oct. 22, 1918 |
| 1,479,524 | Van Guilder | Jan. 1, 1924 |
| 2,102,409 | Faus | Dec. 14, 1937 |
| 2,538,740 | Wallace | Jan. 16, 1951 |